Figure 16:
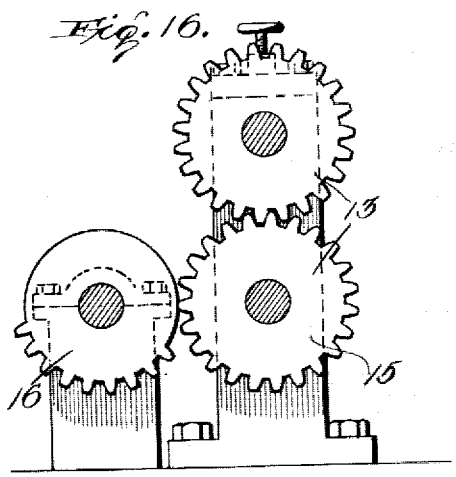

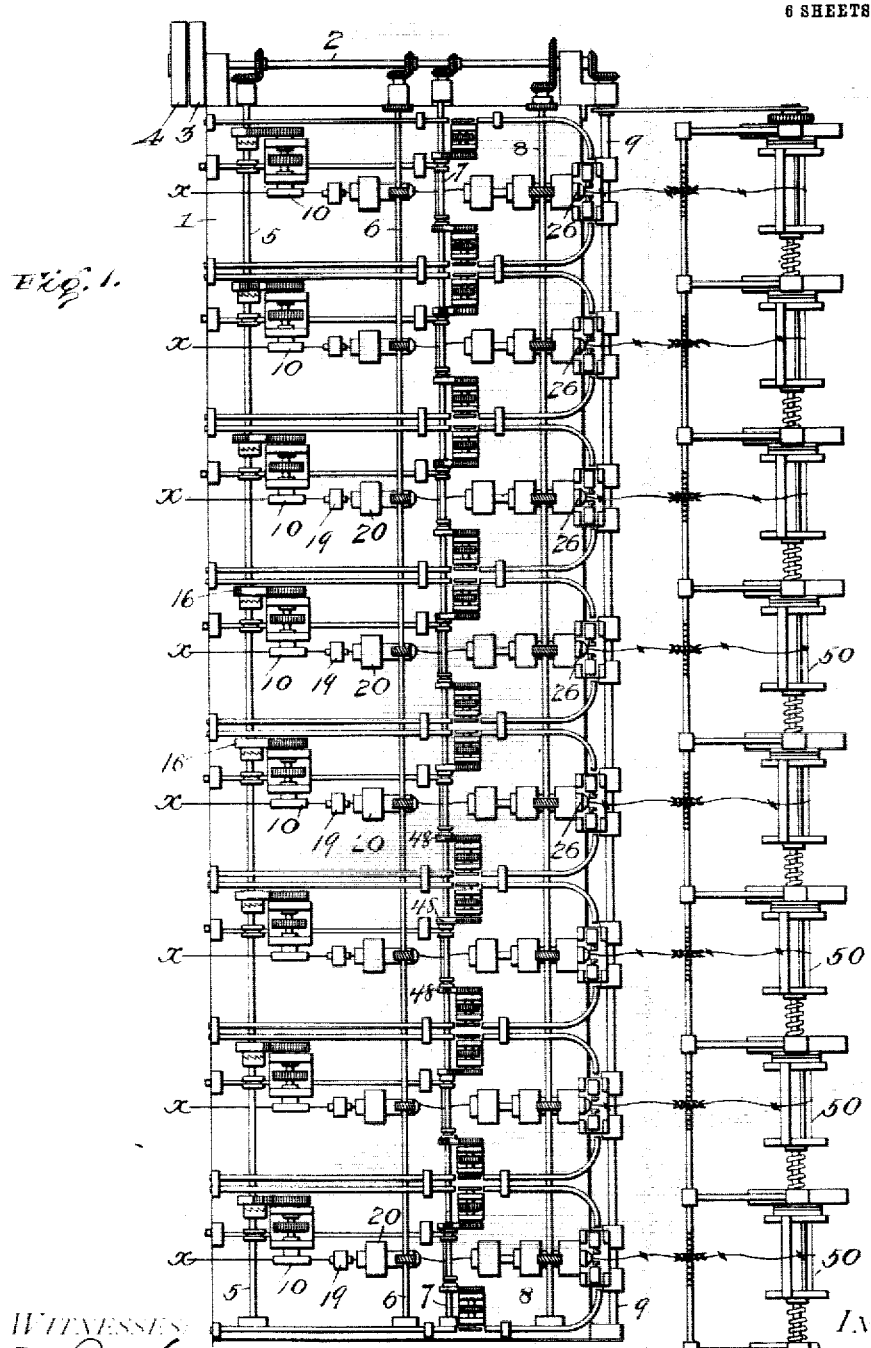

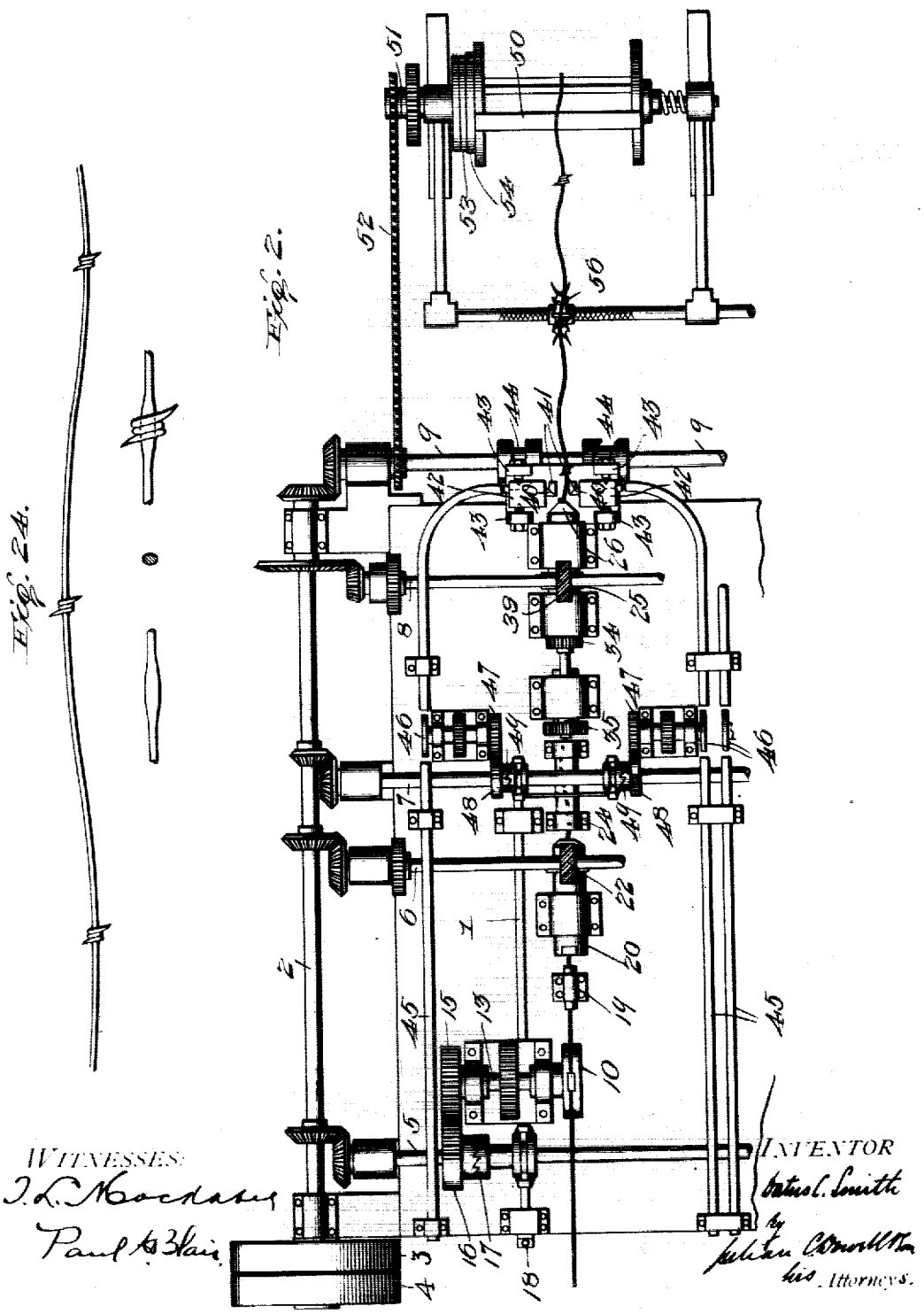

No. 853,604. PATENTED MAY 14, 1907.
D. C. SMITH.
BARBED WIRE MACHINE.
APPLICATION FILED FEB. 18, 1904. RENEWED APR. 15, 1907.
6 SHEETS—SHEET 3.
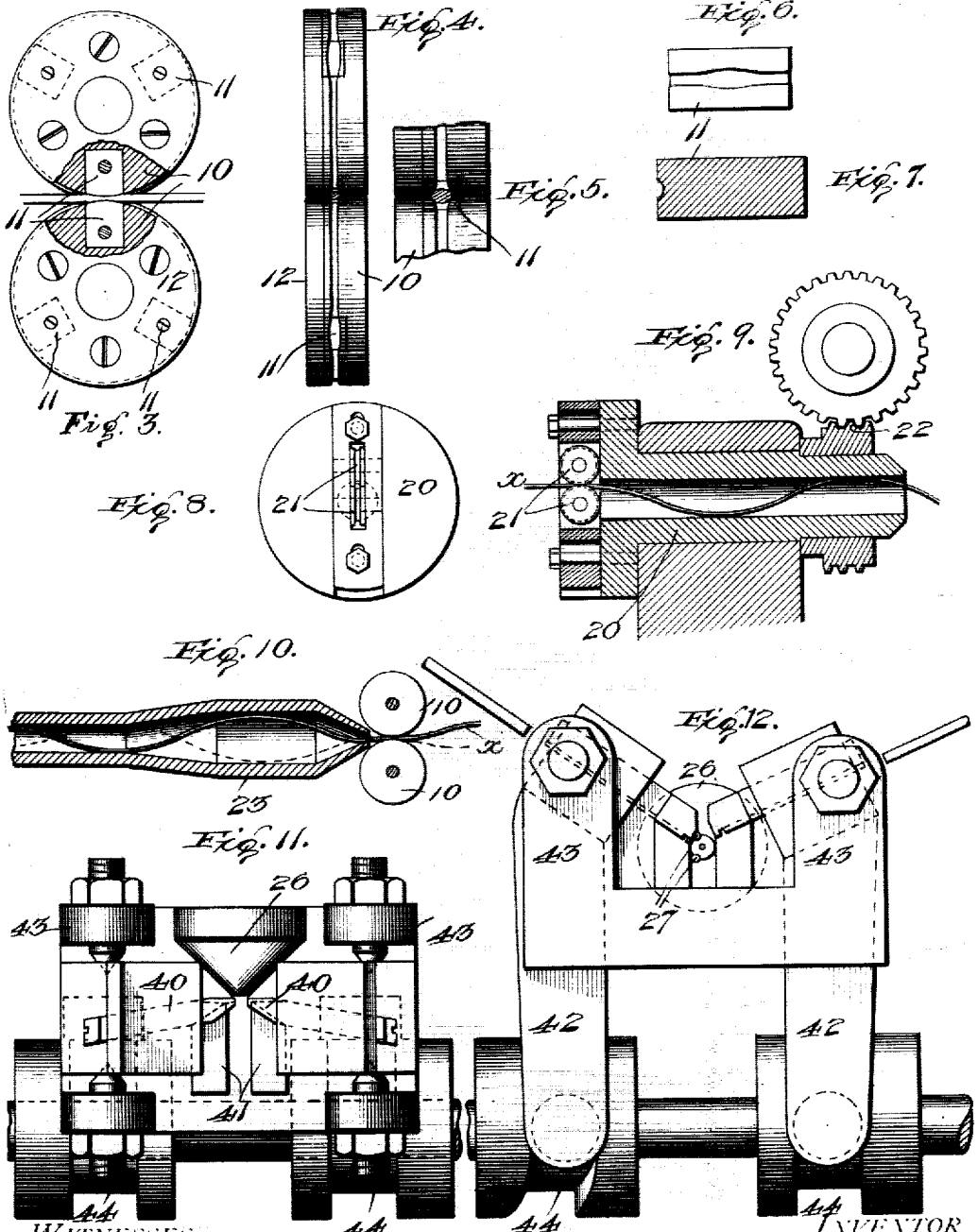

No. 853,604. PATENTED MAY 14, 1907.
D. C. SMITH.
BARBED WIRE MACHINE.
APPLICATION FILED FEB. 18, 1904. RENEWED APR. 15, 1907.
6 SHEETS—SHEET 4.
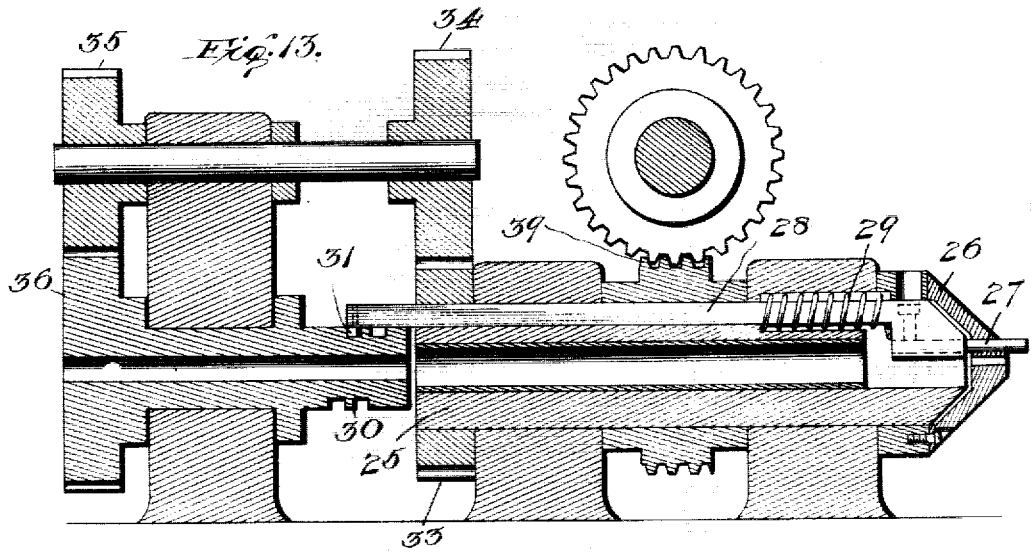
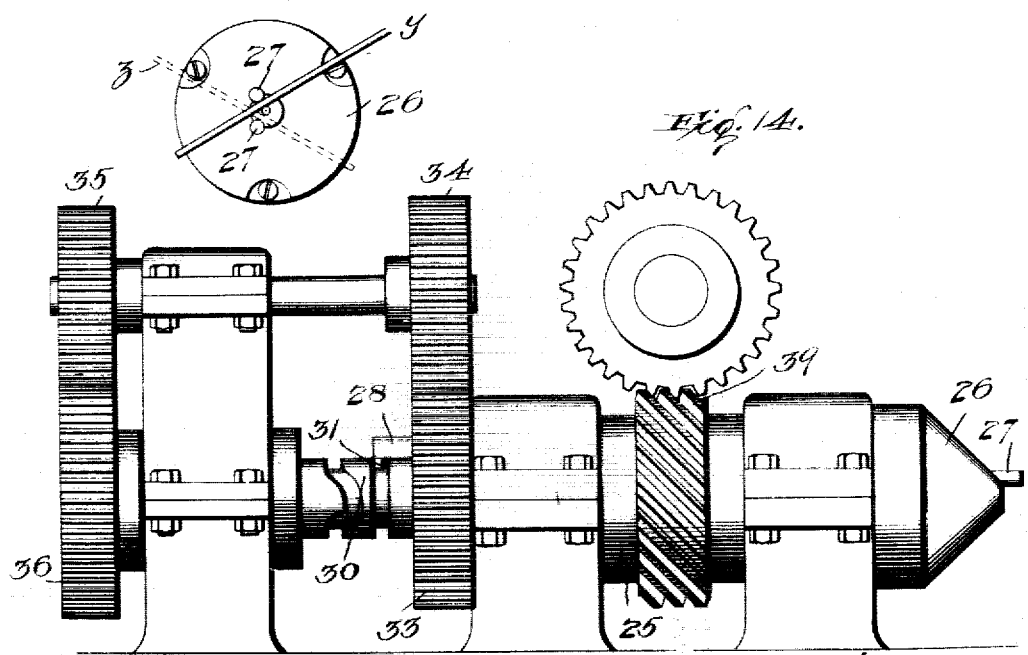
WITNESSES: INVENTOR No. 853,604. PATENTED MAY 14, 1907.
D. C. SMITH.
BARBED WIRE MACHINE.
APPLICATION FILED FEB. 18, 1904. RENEWED APR. 15, 1907.

6 SHEETS—SHEET 5.

WITNESSES:
INVENTOR
Datus C. Smith
By his Attorneys

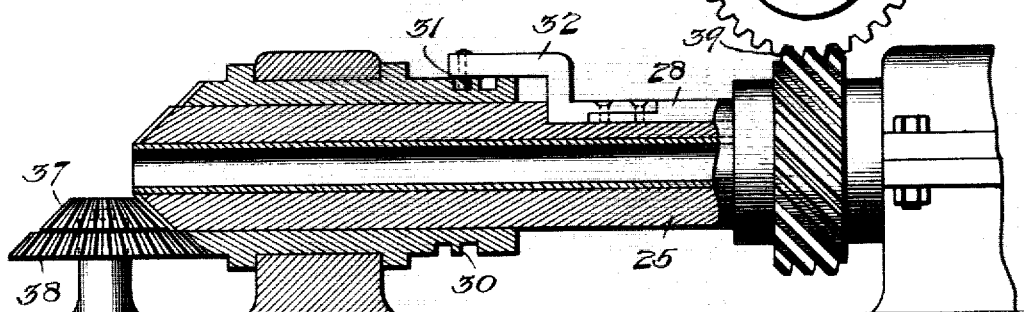
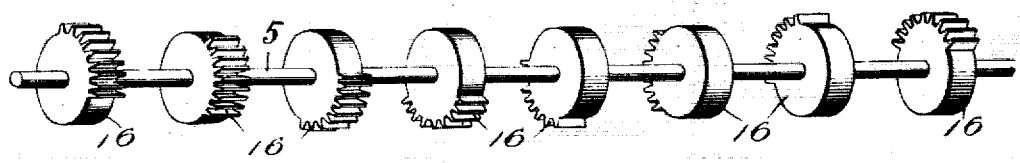

UNITED STATES PATENT OFFICE.

DATUS C. SMITH, OF NEW YORK, N. Y.

BARBED-WIRE MACHINE.

No. 853,604.      Specification of Letters Patent.      Patented May 14, 1907.

Application filed February 18, 1904. Renewed April 15, 1907. Serial No. 368,377.

*To all whom it may concern:*

Be it known that I, DATUS C. SMITH, a citizen of the United States, residing at New York, in the county of New York and State of New York, have invented certain new and useful Improvements in Barbed-Wire Machines; and I do hereby declare the following to be a full, clear, and exact description of the invention, such as will enable others skilled in the art to which it appertains to make and use the same.

This invention relates to barbed-wire making machinery, and particularly to machines which coil and cut the barbs on the strand-wires from the successively presented ends of continuous barbing-wires.

The main object of the invention is the production, by simple and practicable machinery, of elastic single-strand wire with the barbs fixedly secured thereon without injury to the main wire. On account of the imperfections of prior single-strand barbed wires, this variety has been largely dropped and double-strand wire has been generally resorted to by the manufacturers, principally for the purpose of keeping the barbs fixed, and for securing elasticity and different angles of the barbs by twisting the two wires together. Such double-strand barbed-wire practically supplies the market today. But obviously, single-strand wire, if it could be made in satisfactory condition, would be far preferable, owing to its lesser cost and trouble of manufacture, lighter weight, and especially economy of material used in its production not practicable in making double-strand wire, since the latter cannot well be made from lighter wires than now in use. Many attempts, therefore, have been made to produce suitable single-strand barbed-wire, but generally by fatally injuring the strand if the barbs have been immovably fixed, and further always with the fatal neglect to provide suitable elasticity, which is now deemed indispensable in a fence-wire. Although the desirability of elasticity in all fence-wires is well-known, the common barbed-wire, even of the double-strand sort, has not enough elasticity to withstand fully the adverse influences of heat and cold. On these accounts, not one of the single-strand barbed-wires heretofore produced, so far as I am aware, has survived in practical use. On the other hand, the wire produced by means of my present invention is free from such defects, has ample elasticity, and has the barbs fixed immovably thereon but in such a way as not to injure or weaken the wire but rather to strengthen it, and also has its barbed points presented at different angles.

Conspicuous features of my invention are: (1) means for coiling, waving or forming the strand-wires, in the machine or as they are being barbed, for imparting the essential elasticity thereto; (2) means for flattening or compressing the strand-wires at the intervals at which the barbs are applied, in such a manner as to avoid injury and to strengthen rather than weaken such wires; (3) improved and exceedingly simple mechanism for reciprocating the coiling-fingers; (4) means for coiling or twisting the barbs around such coiled or waved strand-wires, or around wires previously so formed, as readily as on straight wires, that is without trouble incident to the spiral or irregular paths of the wires so formed; (5) means for attaching the two-point barbs in such manner as to cause them to present their points at different angles; (6) a simple and compact arrangement of a plurality of mechanisms in a multiple machine, of far greater capacity than has heretofore been attainable, since it has never been found practicable to produce and reel more than one finished barbed-wire at a time in one machine, though this has been suggested; (7) timing of the various mechanisms of such machine so that the transverse series of similar mechanisms or devices across the machine operate in a continuous and steady motion as series while yet affording the necessary intermittency of individual parts comprising such series; and so that the work of the machine is evenly distributed with respect to the periods of rotation of the main driving-shaft; (8) means whereby any one set of mechanisms relating to one strand-wire or any part of a transverse series of similar mechanisms can so far as required be operated independently of its fellows or shut off from operation, to render it possible to continue or discontinue the barbing of any one strand-wire at will; (9) an improved and compact construction and arrangement of winding-reels, in combination with such plurality of mechanisms; (10) and means whereby the several transverse series of similar devices or mechanisms in the wire-barbing part of the machine are operated practically together or in unison while the reels or winding mechanisms operate independently.

In the accompanying drawings, which are to be taken as a part of this specification, I have represented an efficient barbed-wire machine embodying my invention; which however is susceptible of embodiments in other forms, capable of various modifications, and possesses certain features of distinct value in themselves and adapted for use in other relations and mechanisms. Without limiting myself to the particular construction and arrangement shown, the following description of the illustrated machine will serve to set forth the invention, which will thereafter be defined in the annexed claims.

Before passing to a description of this illustrated machine, its general construction and operation should be noted briefly.

The strand-wires to be barbed, indicated in the drawings by the letter $x$, and threaded through the machine from front to back in the usual way, are fed intermittently, and are barbed at proper points during their intervals of rest. During passage through the machine, the strand-wires go through suitable devices for flattening or condensing them at intervals; also through strand-wire coilers or wavers or devices for forming them into such shape as to impart the quality of elasticity; and through the coiling-heads which affix the barbs at the aforementioned flattened or condensed portions. The barbs are coiled and severed from the successively presented ends of barbing-wires, each of which is intermittently fed across its respective strand-wire as previously advanced portions thereof are coiled into barbs and severed. Preferably two barbing-wires are used in connection with each strand-wire. These barbing wires, indicated in the drawings by the letters $y$ and $z$, are fed alternately and are alternately utilized for barbing, which is for the purpose of applying two-point barbs so that the points of alternate barbs project at different angles. From the barbing-mechanism the several strand-wires pass to independent winding-reels, which wind them under suitable tension.

Figure 17:
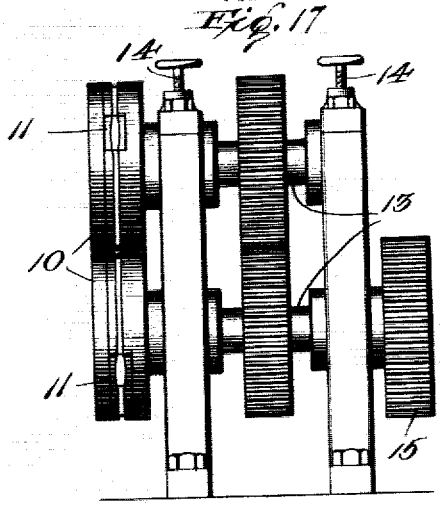
Figure 18:
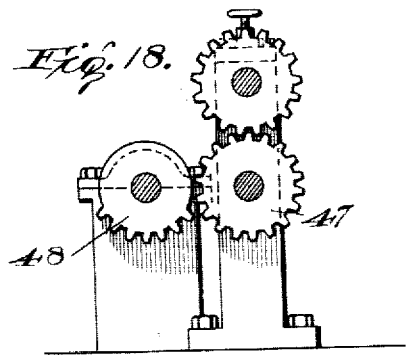
Figure 19:
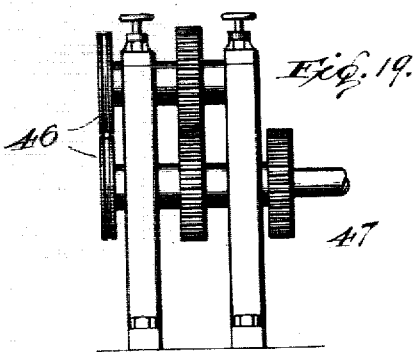
Figure 20:
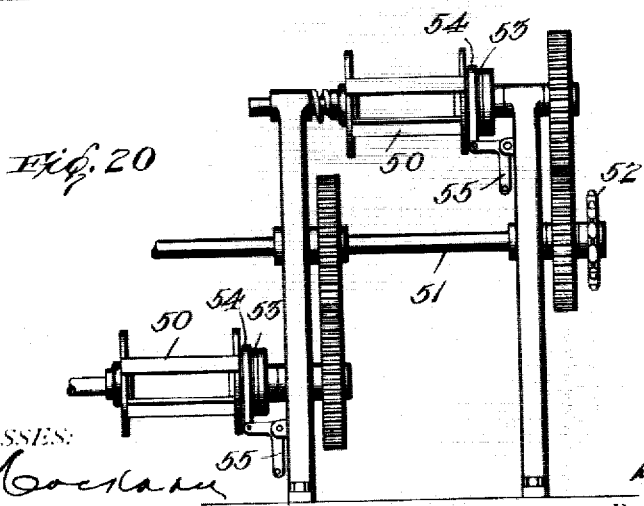

In the drawings: Figure 1 is a top plan view, principally diagrammatic, of a multiple barbed-wire machine embodying my invention. Fig. 2 is an enlarged plan view of a part of such machine, including the mechanisms involved in the production of one line of barbed-wire. Figs. 3 and 4 are detail side and end views of the feed-rollers for the strand-wire. Fig. 5 is a detail fragmentary view of the coacting peripheries of such feed-rollers, showing the wire flattening or compressing dies and the mode of flattening the wire. Fig. 6 is a detail view of one of the dies for flattening or compressing the strand-wire, showing the mold in its face. Fig. 7 is a detail longitudinal section of said die, showing its mold in cross-section. Figs. 8 and 9 are front and longitudinal sectional views of the strand-wire-coiler. Fig. 10 is a view in longitudinal section of a device for guiding previously coiled wire to the feed-rollers. Figs. 11 and 12 are top plan and end views of the coiling-head and cutters. Figs. 13 and 14 are enlarged views in longitudinal vertical section and side elevation respectively of the barb-coiling device. Fig. 15 is an end view of the coiling head, and guides for the barbing-wires. Figs. 16 and 17 are detail side and end views of the gearing for driving the strand-wire feed-rollers. Figs. 18 and 19 are detail side and end views of the barbing-wire feeding mechanism and gearing. Fig. 20 is a back view of some of the reels. Fig. 21 shows a modification of the barb-coiling mechanism, part in side elevation and part in longitudinal section. Fig. 22 is a diagram representing the work done throughout the machine on one stroke of the main driving shaft, assuming certain periods and timing for the various mechanisms. Fig. 23 is a perspective view of a shaft with mutilated gears thereon for driving the several strand-wire feed-mechanisms. Fig. 24 embraces several views of the finished product or barbed-wire of the illustrated machine.

Referring now to the drawings by specific reference symbols, 1 indicates the bed of the machine; 2 denotes the main driving-shaft, shown with the usual pulleys 3 and 4 thereon, one of which is loose and the other fast for application of power; and 5, 6, 7, 8 and 9 designate different transverse shafts driven from the main shaft by suitable gearing and from which power is transmitted to the strand-wire feeding and compressing, strand-wire-coiling, barbing-wire-feeding, barbing and severing mechanisms, and reeling mechanisms. Mounted side by side upon the machine-bed, or along the several transverse shafts, are the several mechanisms or series of devices for acting on or in connection with the different strand-wires. Inasmuch as the various mechanisms for the several wires are of similar construction and operation, a description of those for barbing one strand-wire will suffice.

The strand-wire is fed intermittently by coacting oppositely rotating feed-rollers 10, peripherally grooved as usual for guiding and gripping the wire. These rollers are shown in Figs. 2, 16 and 17 on intergeared shafts 13, the upper one of which is removable from its bearings and has adjusting-screws 14 bearing thereupon to regulate the pressure between the feed-rollers. One shaft has a gear 15 engaged by a mutilated gear 16 on the shaft 5, for transmitting to the rollers the proper intermittent rotation. Said mutilated gear is loosely mounted on its shaft, with which however it can be locked by a suitable clutch 17, adapted to be operated by a lever 18 mounted at the front of the machine and properly connected with the clutch-throw.

For flattening or compressing the strand-wire at intervals, hardened lugs or dies 11 are arranged in the peripheries of the feed-rollers, or in the periphery of one of them, though preferably in both and so as to coact; their distances apart corresponding to the intervals between the barbs and hence corresponding also to the lengths of intermittent movements of the strand-wire. See Figs. 5, 6 and 7. These lugs or dies, which in gripping the wire flatten or compress the same between them, are grooved in continuation of the grooves in the feed-rollers; but the grooves of the dies are in the form of oval molds, contracted at their centers in cross-sectional area yet substantially wider than deep, to impart to the wire as it is gripped by the dies a flattening of general oval character. The effect of these forms of dies is to condense the particles of metal together throughout all parts of the flat, and to avoid injury to the wire at this point. It has been found by experience that flattenings which are strictly flat in cross-section, or which are produced simply by compressing the wire on one or opposite sides, are very injurious in a strand-wire for fencing. As is well known, a slight nick in a wire will cause it to snap in two when bent at the nicked point. The same is true of wires flattened by the old methods, which are impracticable for fencing, since they cannot be bent without tending to break, while moreover they will not stand great tensile strength. The metal thus flattened tends to burst out under the flattening pressure or produce internal seams in the wire, and at best the tendency is to diffuse the particles of metal. To correct this, I have devised the method of flattening here explained. The condensation of metal produced by this method I have found to be so successful that the flats thus made have greater tensile strength than other parts of the wire, as demonstrated by actual tests; while there is also attained the equally important advantage of a flattened wire which will bear much more bending back and forth than a wire flattened in the usual way. Still a further advantage in making the flats by these oval molds is that all sharp edges at the junction of the flats with the body of the wire are avoided, thus affording the barbs a closer coil and better preserving the galvanizing from cracking off at such edges and permitting rust soon to enter the wire. While I prefer a marked oval form, still molds but slightly oval may effect the desired result. The lugs in which the molds are formed may be secured tightly in recesses therefor in the feed-rollers, and held immovably by set-screws inserted through removable plates 12 secured to the sides of said rollers. See Figs. 3 and 4.

From the feed-rollers of the present machine the strand-wire passes through a device for coiling, waving or otherwise forming it into such shape as to give it elasticity. While any appropriate waved or bended form may answer for this purpose, a spiral or coiled shape is preferable. For imparting this shape to the wire, I provide a strand-wire-coiler 20, operating in conjunction with a stationary leader or guide 19 through which the wire is passed in advance of the strand-wire coiler. See Figs. 8 and 9. This coiler, in the form shown, consists of a rotary hollow-shaft, journaled in a suitable bearing therefor, having its bore large enough to accommodate the coiled strand-wire, and carrying at its receiving end a pair of eccentrically disposed coacting grooved rollers 21. Said rollers engage the wire and in revolving carry it round and round; and as the wire is also being fed forward at the same time a spiral or coiled form is thus imparted thereto. This strand-wire-coiler is an efficient device for the purpose. It may be operated intermittently or periodically by means of a mutilated gear, or by means of a clutch, whose clutch-throw may be connected with the lever 18. In place of this device, other suitable means may be substituted for giving an elastic form to the wire; and in some instances such device may be located in advance of instead of behind the feeding mechanism; though an arrangement substantially as represented is preferred. The shaft 20 is shown driven from the transverse shaft 6 by worm-gearing 22.

It is sometimes desired to operate a wire which has been previously coiled, or which is coiled in advance of the feed-rollers. When this is the case, it is important to present the wire to the feed-rollers in such manner as to avoid difficulties or mishaps due to its spiral or irregular form, and to feed and flatten it the same as a straight wire. To accomplish this, I make provision for presenting such a wire to the feed-rollers at a comparatively fixed point, and for swaying the wire in advance of that point to permit such presentation. For this purpose, such a device as illustrated in Fig. 10 may be provided, consisting of a hollow guide or leader 23, having a rear axial opening for exit of the wire of substantially the diameter of the latter, and in close proximity to the coacting peripheries of the feed-rollers, and having its internal bore in advance of such opening sufficiently large to permit a swaying of the wire through a space of about twice the diameter of the coils of the wire, to facilitate its emergence through such opening. Similar provision is made later on for presentation of the coiled wire to the coiling-pins of the barbing-mechanism, and will hereinafter be referred to.

From the strand-wire-coiler, in the illustrated machine, the strand-wire passes through a guide-tube 24 to and through the barbing-mechanism. See Figs. 13, 14 and 15. While any suitable barb-twisting device or coiling-head may be employed, the device illustrated is desired for simplicity, efficient action, and its special adaptation to the needs of this machine and production of wire of the character sought to be attained. A hollow rotary shaft 25, journaled in suitable bearings, has an internal bore preferably larger than the diameter of the coils of the wire, and has at its back end a coiling-head 26 with an eccentrically disposed retractible or reciprocatory coiling-finger or pin 27, or, as in the present case, two of such coiling-pins. In the present case, these coiling-pins are or may be disposed not directly opposite to each other, but both in the same half of the coiling-head, their distance apart considered circumferentially being about one third of the circle. The purpose of this will be explained presently. The coiling-pins are carried by reciprocatory bars 28, slidable in longitudinal grooves in the shaft 25, and adapted to be moved at proper periods for projecting and retracting the coiling-pins.

Various devices may be adopted for reciprocating the bars, but improved and simple means for this purpose is shown in Figs. 14 and 15, where the bars are reciprocated by a cam 30. In the construction here represented, the bars are spring-pressed outward, by springs such as indicated at 29, and carry at their front ends rollers 31 which travel around the cam 30 in contact with its cam-surfaces or in its cam-groove. The cam is used only to retract the bars, since their quick outward thrust is accomplished by the springs; but it may be feasible in some instances to omit the springs 29 and depend on the cam-groove for projecting as well as retracting the coiling-fingers. The bars 28 are shown straight, and they may readily be inserted into their slots or grooves in the shaft 25, when the face of the coiling-head is removed. Where it is desired to employ a cam 30 of larger relative diameter than shown, the front ends of the bars 28 may be provided with goose-neck extentions 32 for carrying the rollers 31, as shown in Fig. 21. The cam 30 is of course hollow, and of sufficient bore to accommodate the coiled or waved strand-wire; and it is shown on a stub-shaft or spindle journaled in suitable bearings. The cam 30 is of such formation that as the rollers 31 travel around it each bar 27 with its coiling-finger is given its desired reciprocation.

Each roller 31 is designed to traverse the cam once for each operation or cycle of movements of its coiling-finger. A stationary cam would answer if the coiling-finger made a single revolution for a barb. A stationary cam with a continuous series of grooves around it adapted for a number of rotations of the coiling-shaft would also serve in some cases. But it is preferable to employ a rotary cam, making one less rotation than the coiling-shaft for each cycle of revolutions of each coiling-finger; and having a separate cam-groove for each roller. Separate cam-grooves are shown for the two rollers 31; but should these rollers be placed diametrically opposite instead of in such a relation as shown both rollers could travel in the same cam-groove. In this machine, where the barbs are coiled alternately, if four rotations of a coiling-shaft are required for the complete operation of one barb, then the coiling-shaft must make eight rotations to every seven rotations of the cam. During every such eight rotations, each roller 31 traverses once the entire path of its groove; and the paths of the two rollers are so related thereto that each bar and coiling-finger remains wholly retracted while the other is in operation; four rotations of the coiling-shaft serving as aforesaid for a cycle of operative movements of each coiling-finger. The timed rotation of the cam with respect to the coiling-shaft may be accomplished in various appropriate ways. The coiling-shaft 25 is shown in Figs. 13 and 14 having a pinion 33 meshing with an equal pinion 34 on an upper short shaft which has a pinion 35 meshing with a larger pinion 36 on the cam-shaft, to transmit the proper differential movement.

As a modified means of timing the cam, in Fig. 21 the coiler-shaft is shown extended forward through the cam and formed with a bevel-gear meshing with a bevel-gear 37 which is rotatable with a larger bevel-gear 38 engaging a similar gear on the cam. The coiler-shaft 25 is shown driven from the transmission-shaft 8 by worm-gearing 39.

Other grooves may be added to the cam for reciprocation of bars or hooks in mechanisms of different character, revolving or not revolving, such as in machines making fabric-fencing; and the reciprocators here described may be applied to valuable use in such mechanisms.

Attention is now directed to a feature of the coiling-head. The central bore of the shaft 25 must be large enough to accommodate a coiled wire, yet the wire must not follow its sinuous or waved path when beneath the coiling-pin's operation. To avoid this, the coiling-head 26 has its axial opening through which the strand-wire emerges contracted at its end to substantially the diameter of the wire, so that the wire emerges therethrough at a fixed point; and provision is made for giving the coiled strand-wire when within the coiler-shaft a swaying motion through a space covering about twice the ordinary diameter of the coils of the wire; thus enabling the wire to pass out through the coiling-head along a fixed point. Thus, the body of the wire appears on opposite sides of this fixed point of emergence in the length of one coil: This swaying motion of the wire is permitted by providing the bore of the hollow shaft 25 sufficiently large, about twice the diameter of the coils of the strand-wire.

Another feature shown in connection with the present coiling-head is means in combination with the opposite alternate in-feeds of the two barbing-wires for coiling and severing the barbs alternately from the two barbing-wires and fixing the successive barbs with their points at different angles to the strand-wire. This is generally considered a necessity in a barbed-wire, having two-point barbs, in order that some barbs of the fence should be at all times presented to stock or cattle approaching the fence; although, under some circumstances it might not be desirable to have such an arrangement. The characteristic referred to, that is the different angular positions of the different barbs, is naturally attained in the ordinary two-strand-barbed-wire, through the twisting of the wires together after they are barbed; but it is not provided for in the manufacture of ordinary single-strand wire having two-part barbs. In the present machine, I accomplish the desired result by cross in-feeding the two barbing-wires $y$ and $z$ and using them alternately as follows. It will be observed from Figs. 11, 12 and 15 that the barbing-wires are not fed from directly opposite sides, nor are the coiling-pins directly opposite, but they are disposed about one-third of a circle apart, as before stated. The result is that the alternate barbing-wires are projected and wrapped around the strand in different positions, and when the finished barbs are severed their points project in different directions. The barbing-wires are fed from opposite sides of the coiler, usually from above the axis of the coiling-head downwardly and across the strand-wire, though at opposite sides thereof since the coiling-head always rotates in the same direction. They are guided, through suitable bores in the cutters 40, to pass closely across the axial opening of the coiling-head and curve forwardly across the face of the collar, so that the coiling or twisting of the barb is performed as near as possible to the point of emergence of the strand-wire.

Coming now to the cutters for severing the barbs from the barbing-wires, it will be observed in Figs. 11 and 12 that the cutting members 40, through bores in which the wires are passed, are carried by the upper ends of levers 42, pivoted or fulcrumed in standards 43, so that said levers may be moved to swing said cutting members vertically or upward and downward. These cutters act in conjunction with fixed cutting members 41. The lower ends of said levers are engaged by cams 44 on the transverse shaft 9, which hold the levers stationary while the barbing-wires are being guided through the tubes and while the barbs are being formed but which rock them to sever the barbs after they have been coiled. Since the two barbing-wires are fed and utilized alternately, it follows that the cutters should also be operated alternately, which is accomplished by setting the two cams 44 otherwise alike in different positions on the shaft 9. The alternate actions of the two coiling pins being in slightly unbalanced time, as already shown, the two cams are correspondingly set in like unbalanced relations, and the alternate infeeding of the barbing-wires in this unbalanced time is likewise provided for. In place of these cutting instrumentalities, other suitable devices may of course be adopted.

The barbing-wires $y$ and $z$ are shown conducted by guide-tubes 45 extending parallel with the main wire. These tubes as they approach the coiling-head extend downward and inward for delivering the wire into the bores of cutters 40, which may be considered as continuations of the tubes 45 and which project the barbing-wires inwardly across either side of the coiler as before stated; the inward curves of the barbing-wires continuing after they pass the strand-wires to give suitable angles for coiling. Feeding of the barbing-wires is accomplished by means of coacting feed-rollers of substantially the same construction and operation as those for the strand-wire, except that the flattening device is omitted.

By reference to Figs. 2, 18 and 19, it will be seen that each barbing-wire is fed by feed-rollers 46, mounted on intergeared shafts, one of which has a spur 47 engaged by a mutilated gear 48 on the transverse shaft 7. Since the barbing-wires are fed alternately, the mutilated gears for the two sets of feed-rollers 46 are set at different angles. Said mutilated gears 48 are loosely mounted on the shaft 7, but locked therewith by clutches 49, the clutch-throws of which may conveniently be connected with the lever 18 at the front of the machine, or may be connected to a separate lever if desired.

The finished barbed-wire is drawn from the machine and wound into coils by suitable reels. Any of the well known forms of reeling mechanisms or take-up devices may be availed of, but in this connection I have provided a very simple, compact construction and arrangement of reels, particularly adapted for a multiple barbed-wire machine. As shown in Figs. 1, 2 and 20, each reel 50 is mounted horizontally between vertical standards or A-frames and loosely on its reel-shaft, which is intergeared with a transverse shaft 51, which in turn is driven continuously from the shaft 9 by sprocket-and-chain gearing 52. The reel has a flat head spring-held against a friction-plate, such as a leather-faced disk 53, fast on the reel-shaft. The reel is held against such friction-plate with sufficient pressure to rotate the reel normally but lightly enough to let the reel stop and slip on the friction-plate during the intermittent dwell of the strand-wires while the barbs are being applied; as well as to let the reel slip thereon to compensate for the gradually increasing size of the coil of wire on the reel. Thus the barbed-wire is continuously drawn taut and tightly wound. A friction-band-brake 54 is shown in connection with the reel, adapted to be operated by a lever 55 when desired to stop rotation of the reel, as when operation on the strand-wire for that reel is suspended. Between the reels and the coiling-head is shown a spreader 56 reciprocating back and forth to distribute the wire evenly along the reel. The friction-reel thus described is I have found practicable and satisfactory in a single-strand machine; but if desired the well known take-up device may be interposed between the reel and the coiling-head.

The detail description thus far given has had reference more especially to the mechanism involved in the production of a single line of barbed-wire; and it will be understood that the construction and operation of the mechanisms for the other wires are the same.
One of the most valuable features of my invention is the capability of embodiment in a multiple barbed-wire machine, which will now be described, with reference more particularly to Fig. 1. The machine here represented is adapted for barbing eight wires. The entire series of feed-rollers 10 are operated from the shaft 5; the strand-wire-coilers or wavers 20 are operated from the shaft 6; the barbing-wire feed-rollers 46 from the shaft 7; the barb-coilers 25 from the shaft 8; and the cutters from the shaft 9. Each set of feed-rollers 10, as well as the feed-rollers 46, is adapted to be thrown into or out of operation by clutches, so that manufacture of barbed-wire by any particular set of mechanisms of the machine may be begun, continued or discontinued at will, independently of the mechanisms for operating on the remaining strand-wires. While the shafting, gearing and co-ordination of parts is a matter which may be left largely to the skilled machinist, yet an arrangement substantially such as herein suggested will commend itself for its great simplicity and practicability.
In this connection it should be noted that all the various series of mechanisms are driven by cross-shafts. Each set of mechanisms relating to the formation of one line of barbed-wire is similarly timed and adjusted with respect to the main driving-shaft. Now it it will be seen that, except for the reels 50, the various transverse series of similar devices or mechanisms operate together; the machine feeds forward together a plurality or series of strand-wires, also a plurality of barbing-wires; operates together the coiling-heads and reciprocates the coiling-pins; and operates together the cutters. Here the simultaneous operations end, and the reeling of the finished separate wires is performed entirely independently. Thus I attain all the advantages of a machine acting in plural form; availing myself of the unity principles employed in wire-fabric-making machinery, while delivering the finished product in its necessarily divided form. This is considered a novel and important result. It does not seem to have been practicable heretofore to finish and reel more than one wire in one machine; nor to barb a series of strand-wires together. In short, a practicable plurality machine appears never before to have been produced; and this in spite of the fact that for twenty years manufacturers have been constantly striving for increased capacity in barbed-wire machines.

I have spoken of the several transverse series of similar mechanisms, excepting the reels, as operating together or practically simultaneously; but while the various operations may be exactly simultaneous, yet by this description I do not mean that the said mechanisms necessarily so operate in strict unison, that is with their movements coincident in starting, ending and intermediate phases. As a matter of fact, it is preferable, while each transverse series of mechanisms operate together or practically simultaneously as a series, that the several units or individual devices of such series be brought into action in slight progression. In a barbed-wire machine of the present character, the various operations, except that of the reel for the finished product, are necessarily intermittent throughout the course of each strand-wire. This intermittent action of the various parts takes the power in condensed periods, gives shock to the machine, interferes with its smooth operation, restricts its out-put and limits its durability. To overcome these difficulties has long been the aim of inventors of the two-strand barbed-wire machines. Hence, to lessen materially the shocks of intermittently throwing into gear coincidently all the devices of any one series, the strand-wire and barbing-wire feeds, the coilers, reciprocators and cutters, I propose to bring the several series of these mechanisms each into action in slight succession, as above suggested. For example, in case of coiling the barbs, the work of the coiling-pins of the several coiling-heads should begin one just after another throughout the entire series. Any slight difference would be of advantage. Thus, while all the coiling-heads are working together in the center of the machine, the action runs progressively from one end of the series to the other, and the power supplied is gradually increased at the beginning and decreased at the ending of the operation of the particular power-transmitting shaft. The same progressive action should be provided for the other series of mechanisms. Such smoother operation of the machine is attained by this arrangement as to increase materially its capacity and durability. The nice adjustments required may be made as follows: For the coiling-heads, since the coiling-pins revolve continuously, they should be adjusted merely with respect to the time of their protrusion and retraction, which is accomplished by proper setting of the cams 30. The timing of the strand-wire-feeds and barbing-wire-feeds are determined by properly setting the mutilated gears 16 and 48, and the cutters by setting their cams 44.

I now propose an important extension of this principle; whereby perfect continuity of action and equal distribution of power is attained throughout each transverse shaft, and also throughout the whole machine, while yet the necessary intermittency of action is provided for the several devices or mechanisms concerned in the production of each line of barbed-wire. My improved multiple machine lends itself readily to the accomplishment of the desired results. Having a considerable number of strands operated in one machine, the more the better in this respect, I am enabled to combine, with continuous movements of the main shaft and several transverse power-transmitting shafts, continuous action of the several transverse series of mechanisms, and yet intermittent action of each of the parts composing such series. This is done by gradually and evenly covering the field of movement of each transverse shaft so that the ending of work at one end of the series operated thereby is immediately followed or practically coincident with the beginning of work at the other end of the series. This is illustrated in the various transmitting shafts for the several series of mechanisms. For example, with reference to the shaft 5 for the strand-wire-feed, it will be observed that the mutilated gears thereon are placed each with the angle of its toothed-portion somewhat to the rear of the preceding one; as represented in Fig. 23.

In case there are eight strands to be barbed, as in the illustrated machine, the position of each mutilated gear is one-eighth back of its predecessor. One turn of the shaft giving enough feed to a wire for one barb, it will be observed that when the shaft has made its full rotation each mutilated gear will have performed in turn its function; the continuously rotating shaft again taking up the work at the first feed without greater intermission than between any other two feeds. But it will be understood that the feed need not be accomplished within this one-eighth rotation; for this period merely indicates the intervals between the successive inceptions of the different feeds. Throughout the machine, this system of a continuous power-transmitting-shaft operating intermittently its individual parts and continuously its series of parts can be arranged for, without new mechanisms, by proper adjustments as hereinbefore suggested. By such arrangement, in my machine, there is no shock in transition from the completion of one series of transverse operations to the beginning of the same series. Nearly all of the various intermittent operations along any one strand-wire require different durations of time for this performance, but that does not interfere with the continuous operations of the series and of the whole machine. If the feed for each strand-wire, for instance, requires a three-eighths turn of the main-shaft, and the feed of each barbing-wire only a one-eighth turn, that simply means that there always would be three strand-wire feeds and one barbing-wire feed in operation at any given time. Not only is great stability given to the various transverse power-transmitting shafts, by such distribution of power, but in like manner evenness of stroke is given to the main driving-shaft, wholly relieving the machine of the jar that is necessarily incident in present machines having intermittent operations. By my construction, the machine is performing all the operations in different parts of the machine at the same time; and the power required is exactly the same for each fraction of rotation of the main shaft corresponding to the number of strands; or in an eight-wire machine the same for every one-eighth stroke of the shaft. To explain this principle, I have shown in Fig. 22 a diagram representing approximately the work of an eight-wire machine in one complete rotation of the main driving-shaft. Referring to the key below the diagram: the heavy line $a$ indicates the strand-wire-feed, with the swell therein representing the flattening or condensing of the wire; the lighter line $b$ indicates the strand-wire-coiler; $c$ the barbing-wire feed; $d$ the barb-coiler; and $e$ the barb-cutter, the first heavy half of $e$ representing the cut and the last lighter half representing the release of the cutter. The diagram is arranged in eight horizontal lines, representing the work during such rotation of the shaft on or in connection with the eight different strand-wires; and in eight vertical columns, representing equal divisions of the stroke of the main shaft. With this information, the diagram will explain itself. Reading down the columns will show the various demands upon the main-shaft during the different eighths of its rotations, and their exact equivalences. Should this successive beginning of the operation of the various parts of series be co-ordinated in line throughout the machine from the first operation up to the finishing of the barb-cutting, it will be seen that there would be no loss of time by such successive beginnings over a perfect unison of beginnings. If the operations on the first strand-wire begin throughout its course an instant sooner than the operations upon the second-strand-wire, and upon the second an instant sooner than those upon the third, and so on, then each strand-wire throughout will in its turn be so much the sooner ready for a repetition of the operation. The machine is first timed for a single strand-wire throughout its course, as though there were only that one strand-wire.

All of the operations throughout on the other strand-wires fall within the space of time provided for the first strand-wire. If one rotation of a transverse shaft will perform any particular intermittent operation for the first strand-wire, then the same one rotation of that shaft will perform like operation for all other of the strand-wires whether they be eight or eighty, within the same period. But instead of being all at one stroke, each has its inception for an eight-wire machine an eighth after its predecessor. All the operations throughout the course of one strand-wire being covered in a fraction of a second, the entire field of operations of the machine in all its different parts will be covered within that same period.

I claim as my invention and desire to secure by Letters Patent of the United States:

1. A barbed-wire machine having, in combination, means for flattening a strand-wire at intervals, and means for coiling barbs fixedly around the flattened portions.

2. A barbed-wire machine having, in combination, mechanism for feeding a strand-wire, flattening devices which engage said wire at intervals and produce flats therein, barb-feeding mechanism, and barb-coiling mechanism through which said strand-wire is threaded, said barb-coiling mechanism operating to coil the barbs fixedly around the said flats in the strand-wire.

3. A barbed-wire machine having, in combination, means for compressing a strand-wire at intervals into flats of general oval character, and means for coiling barbs around such flats.

4. A barbed-wire machine having, in combination, means for feeding a strand-wire, dies adapted to engage and flatten such wire at intervals, and mechanism for coiling barbs around the flats of the strand-wire.

5. A barbed-wire machine having, in combination, means for feeding a strand-wire, dies adapted to engage such wire at intervals and condense the same into flats of general oval character, and mechanism for coiling barbs around such flats.

6. A barbed-wire machine having, in combination, coacting feed-rollers for a strand-wire, dies in said feed-rollers adapted to engage and compress the wire at intervals, and means for coiling barbs around such compressed points.

7. A barbed-wire machine having, in combination, coacting feed-rollers for feeding a strand-wire, means for coiling or waving the wire during the feed thereof, and mechanism for applying barbs at intervals to the coiled or waved wire.

8. A barbed-wire machine having, in combination, means for feeding a strand-wire, periodically-acting mechanism for applying barbs thereto at intervals, and means for coiling or waving the wire to give it elasticity.

9. A barbed-wire machine having, in combination, means for feeding a strand-wire, means for flattening the wire at intervals, mechanism for coiling barbs around the strand-wire at such flattened intervals, and means for coiling or waving the wire to give it elasticity.

10. A barbed-wire machine having, in combination, means for feeding a strand-wire, barbing mechanism, and means located between the barbing and feeding mechanisms for coiling the wire to impart elasticity thereto.

11. A barbed-wire machine having, in combination, means for forming the wire into such shape as to give it elasticity, means for flattening it at intervals, and means for coiling barbs around its flats.

12. A barbed-wire machine having, in combination, means for coiling a strand-wire throughout its length, and mechanism for applying barbs at intervals to such wire.

13. A barbed-wire machine having, in combination, means for forming a strand-wire throughout its length into a continuous bent or other shape than straight, and mechanism for applying barbs to the wire at intervals in rigid fixed position.

14. A barbed-wire machine having, in combination, means for coiling or waving a strand-wire, means for condensing the wire at intervals into flats of general oval character, and mechanism for coiling barbs around such flats of the wire.

15. A barbed-wire machine having, in combination, means for forming a wire into such shape as to give it elasticity, means for condensing the wire at intervals into flats of general oval character, and means for coiling barbs around such flats.

16. A barbed-wire machine having, in combination, means for feeding a strand-wire, dies adapted to engage and flatten such wire at intervals, mechanism for coiling barbs rigidly around the flats of the wire, and means for forming the wire intermediate its barbs into such shape as to give it elasticity.

17. A barbed-wire machine having, in combination, means for feeding a strand-wire, means for forming seats for attachment of barbs at intervals on the wire, mechanism for coiling barbs rigidly around said seats, and means for forming the wire intermediate its barbs into such shape as to give it elasticity.

18. A barbed-wire machine having, in combination, means for coiling or waving a strand-wire, means for flattening it at intervals, and means for coiling barbs around its flats with the points of successive barbs at different angles.

19. A barbed-wire machine having, in combination, means for forming flats at intervals in a strand-wire, mechanism for coiling barbs around said flats, and means for applying the successive barbs with their points at different angles.

20. A barbed-wire machine having, in combination, means for feeding a strand-wire, mechanism for applying barbs at intervals thereto in rigid fixed position, and means for applying the alternate barbs with their points at different angles.

21. A barbed-wire machine having, in combination, means for coiling or waving a strand-wire, mechanism for applying barbs rigidly thereto, and means for applying the successive barbs at different angles.

22. A barbed-wire machine having, in combination, means for feeding a coiled or waved strand-wire, a fixed guide having an opening through which the wire is passed and mechanism operating on said wire at the point of emergence from said guide-opening for applying barbs at intervals thereto in fixed position.

23. A barbed-wire machine having, in combination, means for feeding a coiled or waved strand-wire, and mechanism for applying barbs at intervals thereto in fixed position, and with their points at different angles.

24. A barbed-wire machine having, in combination, means for feeding a strand-wire, mechanism for coiling barbs around said wire at intervals, and means for applying alternate barbs at alternately different angles.

25. A barbed-wire machine having, in combination, coacting feed-rollers for feeding a strand-wire, a strand-wire coiler behind said rollers, and mechanism behind said coiler for affixing barbs to the coiled strand-wire.

26. A barbed-wire machine having, in combination, means for feeding a strand-wire intermittently, means for flattening the wire at intervals corresponding to the lengths of feed, a rotary barb-coiling-head through which the wire is threaded, a coiling-pin carried thereby in proximity to which the flats in the wire are successively brought to rest, means for successively feeding a barbing-wire across the strand-wire, means for operating said coiling-pin to engage and coil said barbing-wire around a flat during rest of the strand-wire, and a cutter successively actuated to sever the successively formed barbs from the barbing-wire.

27. A barbed-wire machine having, in combination, means for feeding a strand-wire intermittently, means for flattening the wire at intervals corresponding to the lengths of feed, means for coiling or waving the wire, a rotary barb-coiling-head having an axial opening for emergence of the wire of substantially the diameter of the wire and a bore in advance of said opening larger than the diameter of the coils of the wire, a coiling-pin carried by the head in proximity to which the flats in the wire are successively brought to rest, means for successively feeding a barbing-wire across the strand-wire, means for operating said coiling-pin to engage and coil said barbing-wire around a flat during rest of the strand-wire, and a cutter successively actuated to sever the successively formed barbs from the barbing-wire.

28. A barbed-wire machine having, in combination, means for intermittently feeding a strand-wire, means for feeding a plurality of barbing-wires successively across the same at different angles with respect to the cross-section of the wire, and means for successively coiling and severing barbs from each barbing-wire with their points in different directions.

29. A barbed-wire machine having, in combination, means for feeding a strand-wire intermittently, means for flattening the same at intervals, and means for coiling barbs thereon at such flattened intervals and alternately with their points in different directions.

30. A barbed-wire machine having, in combination, means for feeding a strand-wire, means for feeding a plurality of barbing-wires in succession across said strand-wire, and mechanism for coiling and severing barbs from such barbing-wires in the order of their feed.

31. A barbed-wire machine having, in combination, means for feeding a strand-wire, means for feeding in alternation a plurality of barbing-wires across the strand-wire, and mechanism for coiling and severing barbs from such barbing-wires.

32. A barbed-wire machine having, in combination, means for feeding a strand-wire, means for feeding a plurality of barbing-wires in succession across such strand-wire and at different angles thereto, and mechanism for coiling and severing barbs from such barbing-wires in the order of their feed, whereby the points of the respective barbs project at different angles from the body of the wire.

33. A barbed-wire machine having, in combination, means for feeding a strand-wire, means for feeding in alternation a plurality of barbing-wires across the strand-wire substantially at the same fixed point with relation to movement of the strand-wire, and mechanism for coiling and severing barbs from such barbing-wires.

34. A barbed-wire machine having, in combination, means for feeding a strand-wire, means for feeding in alternation a plurality of barbing-wires across the strand-wire and at different angles thereto, and mechanism for coiling and severing barbs from such barbing-wires.

35. A barbed-wire machine having, in combination, means for feeding a plurality of barbing-wires across a strand-wire and at different angles thereto considered from a view-point along the length of the strand, and mechanism for coiling and severing barbs from such barbing-wires.

36. A barbed-wire machine having, in combination, means for feeding in alternation a plurality of barbing-wires across a strand-wire at intervals on the latter, and alternately acting devices for coiling and severing barbs from such barbing-wires.

37. A barbed-wire machine having mechanism for applying two-point barbs to a single strand-wire and means for applying the successive barbs at different angles to the body of the wire.

38. A barbed-wire machine having, in combination, means for intermittently feeding a strand-wire, means for alternately feeding across the strand-wire a plurality of barbing-wires, and mechanism for alternately coiling and severing barbs from such wires during the intermittent dwells of the strand-wire.

39. A barbed-wire machine having, in combination, means for intermittently feeding a strand-wire, means for alternately feeding across the strand-wire a plurality of barbing-wires at different angles thereto, and periodically-acting mechanism for coiling and severing barbs from such wires during the intermittent dwells of the strand-wire.

40. A rotary coiling-head having an axial opening for a strand-wire, means carried by said head for coiling transversely presented cross-wire around said strand-wire, and means for presenting such cross-wire alternately at different angles across the strand-wire.

41. A rotary coiling-head having an axial opening for a strand-wire, a pair of alternately acting coiling-pins carried by said head, and means for presenting barbing-wire across the strand-wire alternately from opposite sides thereof.

42. A rotary coiling-head having an axial opening for a strand-wire, means carried by said head for coiling transversely presented cross-wire around said strand-wire, and means for presenting such cross-wire from opposite sides and alternately at different angles across the strand-wire.

43. A rotary coiling-head having an axial opening for a strand-wire, a pair of alternately acting coiling-pins carried by said head not diametrically opposite, and means for presenting barbing-wire across the strand-wire alternately from opposite sides thereof and at different angles.

44. A rotary coiling-head having an axial opening for a strand-wire, a pair of alternately acting coiling-pins carried by said head not diametrically opposite, and means for advancing barbing-wire across the strand-wire alternately from opposite sides thereof and alternately above and below the strand-wire.

45. In a barbed-wire machine, means for feeding a strand-wire intermittently, a rotary coiling-head having an axial opening for said strand-wire, alternately acting coiling-pins carried by said head, and means for feeding alternately barbing-wires across the strand-wire from opposite sides thereof.

46. In a barbed-wire machine, means for feeding a strand-wire intermittently, a rotary coiling-head having an axial opening for said strand-wire, alternately acting coiling-pins carried by said head not diametrically opposite, and means for feeding alternately barbing-wires across the strand-wire from opposite sides thereof and at different angles.

47. A rotary coiling-head having an opening for a strand-wire, a pair of coiling-pins carried by said head alternately acting in unbalanced time, and means for alternately advancing across the wire the extremities of different barbing-wires for alternate engagement by said coiling-pins.

48. A rotary coiling-head having an opening for a strand-wire, a pair of alternately acting coiling-pins carried by said head occupying unbalanced positions, and means for alternately advancing across the wire the extremities of different barbing-wires for alternate engagement by said coiling-pins.

49. A rotary coiling-head having an axial opening for a strand-wire, a pair of coiling-pins carried by said head alternately acting in unbalanced time, and means for presenting barbing-wire across the strand-wire alternately at different angles thereto for alternate engagement by said coiling-pins.

50. A rotary coiling-head having an axial opening for a strand-wire, a pair of coiling-pins carried by said head alternately acting in unbalanced time, and means for presenting barbing-wire across the strand-wire alternately from opposite sides thereof for alternate engagement by said coiling-pins.

51. A rotary coiling-head having an axial opening for a strand-wire, a coiling-pin carried thereby adapted to project and coil a cross-wire and retract, a reciprocatory bar connected to said coiling-pin, and a rotary cam for reciprocating said bar, said cam being actuated by the coiling-head.

52. A rotary coiling-head having an axial opening for a strand-wire, a coiling-pin carried thereby adapted in a given number of revolutions to project and coil a cross-wire and retract, a reciprocatory bar for actuating said coiling-pin, and a cam for reciprocating said bar adapted to rotate once less than the coiling-head in every number of such revolutions of the coiling-pin.

53. A rotary coiling-head having an axial opening for a strand-wire, a reciprocatory coiling-pin carried by said head adapted to engage and coil a barb or cross-wire around the strand, and a rotary cam actuated by the coiler maintaining said coiling-pin projected at intervals in position to coil and periodically withdrawing or releasing the same to escape the finished coils.

54. A rotary coiling-head having its shaft axially bored for a strand-wire, a reciprocatory bar revolving with the head, a coiling-pin carried thereby, a rotary cam actuated by the coiler for reciprocating said bar, and suitable gearing between the coiler-shaft and cam for properly timing the latter with respect to the rotations of the coiling-head.

55. A rotary coiling-head having its shaft axially bored for a strand-wire, a reciprocatory bar revolving with the head, a coiling-pin carried thereby, a rotary cam for reciprocating said bar, an idle-shaft, equal intermeshing gears on said idle-shaft and the shaft of one of such rotary elements, and unequal intermeshing gears on said idle-shaft and the shaft of the other rotary element.

56. A rotary coiling-head having an axial opening for a strand-wire, a spring-projected sliding bar embedded in the coiler spindle and a coiling-pin carried thereby, and an alined axially-bored cam connected to said bar adapted to hold such coiling-pin retracted at intervals.

57. A rotary coiling-head having an axial opening for a strand-wire, a spring-projected coiling-pin carried thereby, a reciprocatory bar revolving with the coiler-shaft and connected with said coiling-pin, and a cam for holding said bar retracted at intervals, said cam being circumferentially grooved, and said bar having a roller traveling in said groove.

58. A rotary-coiling-head having an axial opening for a strand-wire, a spring-projected coiling-pin carried thereby, and a coaxial rotary cam adapted to hold such coiling-pin retracted at intervals, said cam being axially-bored and alined with the coiler.

59. In a barbed-wire machine, the combination with means for feeding a strand-wire, of coacting dies adapted to engage and compress said wire at intervals to provide seats for attachment of barbs, and mechanism for coiling barbs around said seats.

60. In a barbed-wire machine, the combination with means for feeding a strand-wire, of coacting dies adapted to engage and compress said wire at intervals into flats of general oval character, and mechanism for coiling barbs around said flats.

61. In a barbed-wire machine, coacting grooved feed-rollers between which a strand-wire is gripped and fed, and peripheral dies in said rollers having oval molds for flattening said wire at intervals.

62. In combination with means for feeding coiled or waved strand-wire, a guide for such wire having an opening for passage of the wire therethrough, said opening being of approximately the diameter of the wire, provision for allowing a sway of such wire in advance of said guide-opening, and barbing mechanism for coiling a barb around said wire in close proximity to the point of emergence of said wire from said guide-opening.

63. In combination with means for feeding a coiled or waved strand-wire, a guide-tube therefor having a contracted exit-opening and a bore in advance of said opening of about twice the ordinary diameter of the coils, and barbing mechanism arranged for applying barbs on the wire in close proximity to the point of emergence from said exit-opening.

64. A barbed-wire machine for producing a plurality of finished barbed-wires, said machine having, in combination, means for feeding a series of strand-wires, means for feeding a series of barbing-wires longitudinally of said strand-wires, means for directing the extremities of said barbing-wires across the strand-wires, a series of barbing-mechanisms for coiling barbs from such barbing-wires around the several strand-wires, and a series of cutters for severing the barbs.

65. A barbed-wire machine having, in combination, means for feeding a series of strand-wires, means for feeding a series of barbing-wires longitudinally of said strand-wires, means for directing the extremities of said barbing-wires across the strand-wires, a series of barbing-mechanisms for coiling barbs from such barbing-wires around the several strand-wires, a series of cutters for severing the barbs, and a series of independently acting reels for winding the separate finished barbed-wires.

66. A barbed-wire machine having, in combination, a series of mechanisms operated together for barbing a series of strand-wires, and a series of independently acting reeling-devices for the several finished barbed-wires.

67. A barbed-wire machine having a series of mechanisms for barbing a series of strand-wires, said mechanisms operating progressively as series and periodically as individuals.

68. A barbed-wire machine having a series of mechanisms for barbing a series of strand-wires, said mechanisms operating progressively as series and periodically as individuals, together with a series of independently acting reeling-devices for the several finished barbed-wires.

69. A barbed-wire machine having a series of mechanisms for barbing a series of strand-wires, said mechanisms operating as a series continuously and progressively across the series.

70. A barbed-wire machine having, in combination, a series of strand-wire-feeding mechanisms each acting intermittently, a series of barbing-mechanisms each acting periodically, said series each operating together as series, and a series of independently acting reeling-devices.

71. A barbed-wire machine having, in combination, a series of strand-wire-feed mechanisms each acting intermittently, and a series of barbing-mechanisms each acting periodically, each series acting progressively as series.

72. A barbed-wire machine having, in combination, a plurality of sets of mechanisms for operating on a series of strand-wires and comprising transverse series of instrumentalities, each of such series operating progressively as series and intermittently as individuals.

73. A barbed-wire machine having, in combination, a driving-shaft, and a series of mechanisms for barbing a series of strand-wires, said mechanisms acting intermittently as individuals but progressively as series and timed so that all operate within the same period of rotation of the driving-shaft.

74. A barbed-wire machine having, in combination, means for feeding a series of strand-wires, a series of barbing-mechanisms all operating together, and means for stopping or starting at will operation on any one strand-wire of the series independently of the remaining ones.

75. A barbed-wire machine having, in combination, means for feeding a series of strand-wires, means for feeding a series of barbing-wires, a series of mechanisms operated together for barbing said strand-wires from said barbing-wires, and means for discontinuing or continuing at will the feed of any one strand-wire and its barbing-wire.

76. A barbed-wire machine having, in combination, means for feeding a series of strand-wires, a series of barbing-mechanisms, and a series of independently acting winding-reels arranged side by side alternately one above another at the delivery end of the machine.

77. A barbed-wire machine having, in combination, mechanism for intermittently feeding a strand-wire, mechanism for flattening or compressing said wire at intervals, and barbing-mechanism at which the flats or compressed portions are successively brought to rest; said barbing-mechanism adapted for coiling wire-barbs around the flats during the intermittent dwells of the strand-wire.

78. A barbed-wire machine having, in combination, mechanism for feeding a strand-wire, mechanism for coiling or waving said wire, a rotary barb-coiler having an axial opening for emergence of the wire of substantially the diameter of the wire and a bore in advance of said opening larger than the diameter of the coils or undulations of the wire, means for feeding a barbing-wire across the strand-wire in proximity to said emergence-opening of the coiler, means on said coiler for engaging and coiling the successively presented ends of said barbing-wire around the strand-wire, and a cutter adapted to sever the successively formed barbs from the barbing-wire.

79. A barbed-wire machine having, in combination, mechanism for feeding a strand-wire, mechanism for coiling or waving said wire, a barb-applying device, and a guide for the strand-wire comprising a tube having an internal bore of larger diameter than the coils or waves of the strand-wire and an opening of substantially the diameter of the wire for emergence of the wire at the barb-applying device.

80. In a fence-machine, means for flattening or compressing a wire comprising flat-forming dies which condense the wire inward from more than two opposite directions.

81. In a fence-machine, a rotary coiler having a central bore adapted for passage of a coiled or waved wire therethrough and having an axial opening of substantially the diameter of the wire for emergence of the wire at a fixed point from the coiler.

82. A rotary coiling-head having an opening for a strand-wire, a pair of coiling-pins carried by said head adapted for alternately coiling barbs from barbing-wire fed across the strand, and means for feeding barbing-wire for alternate engagement by said coiling-pins.

83. A barbed-wire machine having, in combination, means for feeding a strand-wire, mechanism for coiling barbs around said wire at intervals, and means for effecting different angular positions of the different barbs on the finished wire.

84. A barbed-wire machine adapted for producing concurrently a plurality of finished barbed-wires, said machine having, in combination, means for feeding a plurality of strand-wires, a plurality of barbing mechanisms for applying barbs to such wires, and independent reels for winding the separate finished barbed-wires.

85. A barbed-wire machine adapted for producing a plurality of finished barbed-wires, said machine having, in combination, means for feeding a plurality of strand-wires, a plurality of barbing mechanisms operating together, and means for stopping or starting at will operation on any one strand-wire of the number.

86. A barbed-wire machine having, in combination, means for feeding a strand-wire having an elastic form other than straight, means for compressing or flattening said wire and thereby providing barb-seats, and mechanism arranged for fixedly coiling wire-barbs around the same.

87. A barbed-wire machine having, in combination, means for feeding a strand-wire flattened to provide barb-seats, means for forming said strand into such other shape than straight as to render it elastic, and mechanism arranged for fixedly coiling wire-barbs around the same.

88. A barbed-wire machine having, in combination, means for feeding a strand having an elastic form and flattened to provide barb-seats, and barb-coiling mechanism arranged for fixedly coiling wire barbs around the same with the axial centers of the coiled portions of the barbs substantially coincident with the axial center of the strand itself.

89. A barbed-wire machine having, in combination, means for fixedly-attaching wire barbs to the strand by coiling said barbs around the strand with the axial center of the coiled portions of the barbs substantially in one line approximately coincident with the axial center of the strand, and means for forming the strand into such other shape than straight, intermediate its barbs, as to render the same elastic.

90. The combination of mechanism for forming a strand-wire into such other shape than straight as to render the same elastic, and means operating on said wire to flatten the same to provide barb-seats for attachment of coiled barbs around the same.

In testimony whereof I affix my signature, in presence of two witnesses.

DATUS C. SMITH.

Witnesses:
G. W. HANNA,
G. A. EATON.